United States Patent
Rocco et al.

(10) Patent No.: US 11,427,076 B1
(45) Date of Patent: Aug. 30, 2022

(54) PORTABLE FUEL TANK CONFIGURED TO BE RELEASABLY SECURED

(71) Applicants: Matt Rocco, Lake City, FL (US); Micah Fuoco, Lake City, FL (US)

(72) Inventors: Matt Rocco, Lake City, FL (US); Micah Fuoco, Lake City, FL (US)

(*) Notice: Subject to any disclaimer, the term of this patent is extended or adjusted under 35 U.S.C. 154(b) by 0 days.

(21) Appl. No.: 17/203,199

(22) Filed: Mar. 16, 2021

Related U.S. Application Data

(63) Continuation-in-part of application No. 16/100,377, filed on Aug. 10, 2018, now abandoned.

(51) Int. Cl.
*B60K 15/067* (2006.01)
*B60K 15/03* (2006.01)

(52) U.S. Cl.
CPC .. *B60K 15/067* (2013.01); *B60K 2015/03144* (2013.01); *B60K 2015/03164* (2013.01); *B60K 2015/03256* (2013.01)

(58) Field of Classification Search
CPC ........ F02M 37/0076; Y10T 137/86324; Y10T 137/86348; Y10T 137/86187; B63B 17/0027; B60K 2015/03118; B60K 15/067; B60K 2015/03144; B60K 2015/03164; B60K 2015/03256
See application file for complete search history.

(56) References Cited

U.S. PATENT DOCUMENTS

| | | | | |
|---|---|---|---|---|
| 3,158,193 A | * | 11/1964 | Anderson | F02M 37/0088 137/255 |
| 3,409,040 A | ‡ | 11/1968 | Weston | B63H 20/001 137/572 |
| 4,765,359 A | ‡ | 8/1988 | Burnett | B60K 15/00 137/255 |
| 5,297,578 A | ‡ | 3/1994 | Scott | F02M 25/0836 137/510 |
| 6,138,853 A | ‡ | 10/2000 | Frechette | B63B 17/00 220/212.5 |
| 7,927,482 B1 | ‡ | 4/2011 | Luke | A61C 19/00 137/565.01 |
| 10,343,750 B1 | ‡ | 7/2019 | Heinmiller | B67D 7/0492 |
| 2007/0169758 A1 | ‡ | 7/2007 | Mills | F02M 37/0082 123/518 |
| 2010/0065597 A1 | * | 3/2010 | Grater | B60K 13/02 224/555 |

* cited by examiner
‡ imported from a related application

*Primary Examiner* — Umashankar Venkatesan
(74) *Attorney, Agent, or Firm* — Gulf Coast Intellectual Property Group

(57) ABSTRACT

A portable fuel tank that is configured to be operably secured to an apparatus having a combustible engine so as to provide fuel for the operation thereof. The portable fuel tank includes a body having walls, top and a bottom integrally formed to create an interior volume for receiving and storing fuel. The body has a one-way valve secured to the top thereof. A fuel cap is hermetically sealed to the body and includes a fuel pickup line operably coupled thereto. The fuel transfer line is fluidly coupled to the machine having the combustible engine and includes a one-way valve and a quick connect assembly. Locking tabs are provided to secure a first portable tank to a second portable tank. A mateable fastener is formed in the body of the tank and is configured to be releasably secured to a mateable fastener on the machine.

4 Claims, 2 Drawing Sheets

PORTABLE FUEL TANK CONFIGURED TO BE RELEASABLY SECURED

CROSS REFERENCE TO RELATED APPLICATIONS

This application is a continuation-in-part of U.S. patent application Ser. No. 16/100,377 filed, Aug. 10, 2018, entitled, Fuel Tank, in the name of Matt Rocco, which is hereby incorporated for reference.

FIELD OF THE INVENTION

The present invention relates generally to fuel system components, more specifically but not by way of limitation, a portable fuel tank that is configured to be transportable and releasably secured to equipment having a combustible engine so as to be the primary fuel source for operation thereof.

BACKGROUND

Combustible engines are well known in the art and are utilized to provide power and operation of numerous types of apparatus to include but not limited to vehicles, lawn equipment and construction equipment. The combustible engines that are a part of the aforementioned apparatus are provided in numerous different sizes and are typically deployed as either a two-stroke motor or a four-stroke motor. The size of the motor varies depending upon the intended application for the apparatus as well as the desired run time. Smaller motors are typically installed on objects such as but not limited to lawn mowers and go-carts. These apparatus typically have a smaller fuel tank that is either integrated into the motor frame construction or the apparatus itself. Conventional fuel tanks can typically be quite small with most not exceeding a few gallons.

As a result of the small fuel capacity for many of the aforementioned apparatus, users thereof will typically have to refuel quite frequently. Refueling a fuel tank often requires the utilization of a portable larger fuel tank such as but not limited to a five gallon portable tank. These portable tanks are typically filled at a gas station then transported to a desired destination and utilized to manually refuel a gas tank of an apparatus. One issue with refueling as discussed herein above is the weight of a full portable gas container. A five-gallon container that is full with fuel will weigh approximately thirty pounds. This container must be lifted, held and positioned to deposit fuel therefrom into a fuel tank of an apparatus. The aforementioned activities require that a person be in good physical condition. Many individuals operating apparatus that need to be refueled are unable to lift a heavy portable gas container thus making the task difficult to perform. Additionally, it is quite common for fuel spillage to occur during the transfer of fuel from a portable gas container to a fuel tank.

Accordingly, there is a need for a portable gas tank that can be easily transported wherein the portable gas tank is directly coupled to a machine having a combustible engine and operably secured thereto so as to provide operation thereof.

SUMMARY OF THE INVENTION

It is the object of the present invention to provide a portable fuel tank that is configured to be directly coupled to a combustible engine of a machine wherein the portable fuel tank is substituted for an integrated fuel tank on the machine.

Another object of the present invention is to provide a portable fuel tank operable to be directly coupled to a plurality of apparatus that operate utilizing a combustible engine wherein the portable fuel tank is formed from a plurality of walls, bottom and top integrally formed to create an interior volume suitable to accommodate fuel therein.

A further object of the present invention is to provide a portable fuel tank that is configured to be directly coupled to a combustible engine of an apparatus wherein the top of the body of the present invention includes a one-way vent valve operably coupled thereto.

Still another object of the present invention is to provide a portable fuel tank operable to be directly coupled to a plurality of apparatus that operate utilizing a combustible engine that further includes a vent-less fuel cap secured to the top of the body of the portable fuel tank.

An additional object of the present invention is to provide a portable fuel tank that is configured to be directly coupled to a combustible engine of an apparatus wherein the vent-less fuel cap has an integral fuel line that is configured to be operably coupled to the fuel system of a combustible engine with a quick connect assembly.

Yet a further object of the present invention is to provide a portable fuel tank operable to be directly coupled to a plurality of apparatus that operate utilizing a combustible engine wherein the vent-less fuel cap includes a fuel pick-up line integrally formed therewith that is configured to extract fuel from the interior volume of the body.

Another object of the present invention is to provide a portable fuel tank that is configured to be directly coupled to a combustible engine of an apparatus that further includes locking tabs formed on the sidewall thereof so as to facilitate securing of a second tank to a first tank.

Still a further object of the present invention is to provide a portable fuel tank operable to be directly coupled to a plurality of apparatus that operate utilizing a combustible engine that further includes a handle on one wall thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
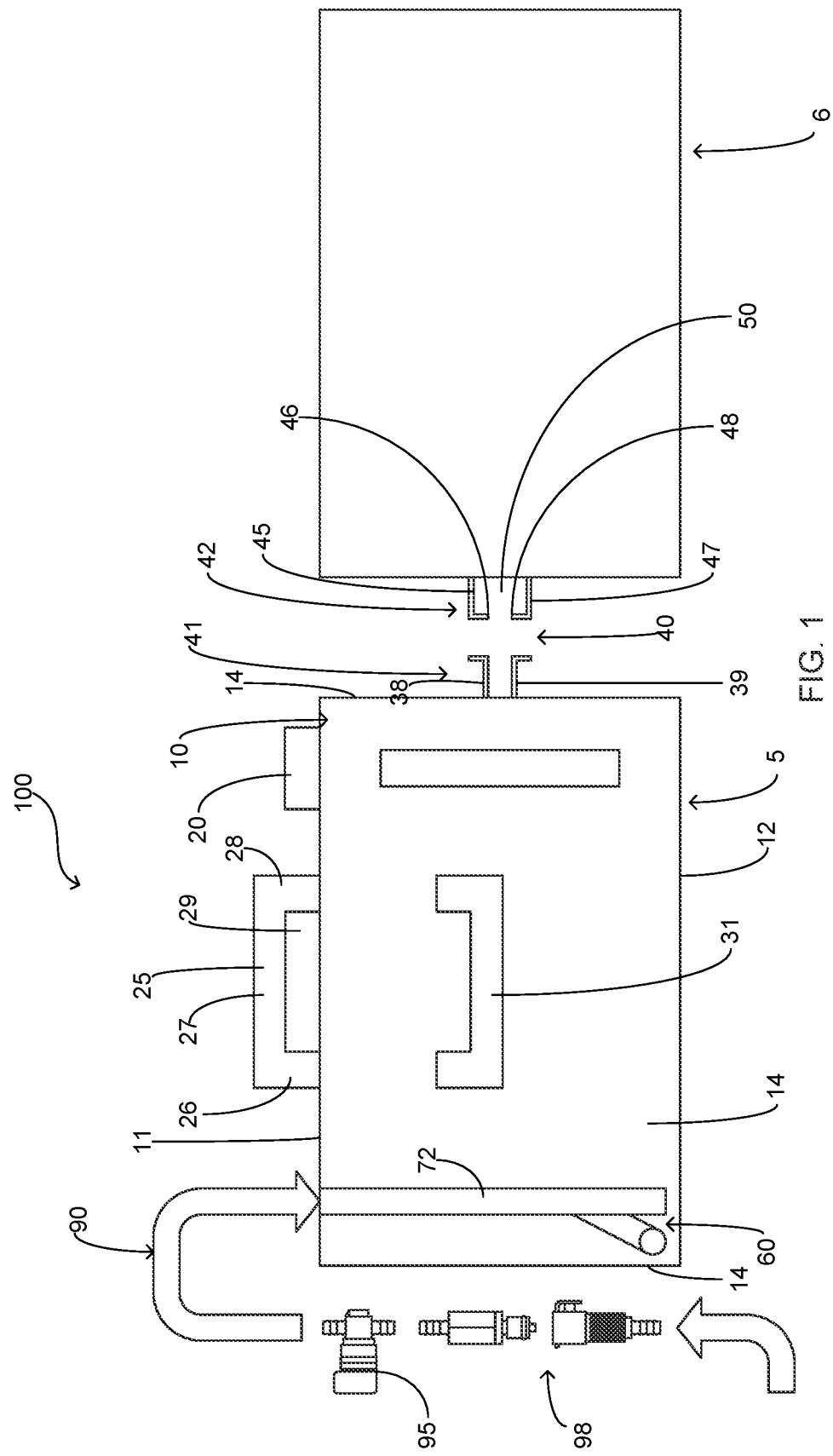
FIG. 1 is schematic view of the present invention that further includes an additional tank.

Referring now to the drawings submitted herewith, wherein various elements depicted therein are not necessarily drawn to scale and wherein through the views and figures like elements are referenced with identical reference numerals, there is illustrated a portable fuel tank 100 constructed according to the principles of the present invention.

An embodiment of the present invention is discussed herein with reference to the figures submitted herewith.

Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
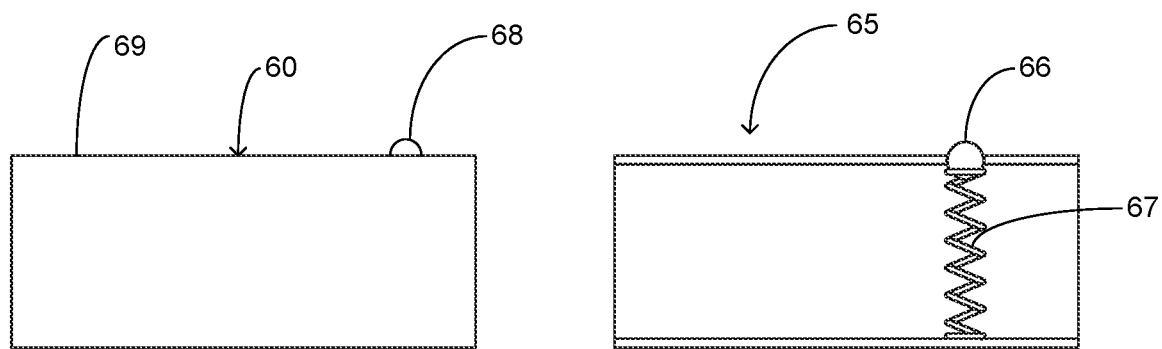
FIG. 2 is a side cross sectional view of the coupling device integrated into the portable tank of the present invention.

Referring in particular to FIGS. 1 and 2 herein, the portable fuel tank 100 further includes a body 10. The body 10 includes a top 11, bottom 12 and a plurality of walls 14 integrally formed to create an interior volume. The body 10 is manufactured from a suitable durable material such as but not limited to plastic. It is contemplated within the scope of the present invention that the body 10 could be manufactured in various sizes so as to be operably coupled to a plurality of alternate apparatus. Furthermore, it should be understood within the scope of the present invention that the body 10 could be manufactured in alternate shapes in addition to the shape illustrated in the drawings submitted as a part hereof.

Formed in the top 11 utilizing suitable techniques is a valve 20. Valve 20 is a one-way valve that is configured to facilitate the flow of air into the tank and inhibit flow in the opposite direction. It is contemplated within the scope of the present invention that the valve 20 could be manufactured of varying flow rates so as to accommodate a body 10 of alternate size so as to provide sufficient airflow into the interior volume of the body 10 to prevent a vacuum when fuel is being transferred out of the interior volume to a combustible engine. While one valve 20 is illustrated and discussed herein for the preferred embodiment of the present invention, it is contemplated within the scope of the present invention that the fuel tank 100 could be configured with more than one valve 20. A configuration of a plurality of valves 20 could be utilized to prevent a vacuum in the application of rapid fuel consumption by a combustible engine with which the fuel tank 100 is operably coupled.

The body 10 includes a first handle 25 integrally formed to top 11. The handle 25 includes portions 26,27 and 28 that are formed so as to create a void 29 intermediate the handle 25 and top 11. While a specific shape of the handle 25 has illustrated herein, it is contemplated within the scope of the present invention that the handle 25 could be formed in alternate shapes and sizes. The handle 25 provides an interface for a user to transport the fuel tank 100 as needed. A second handle 31 is provided wherein the second handle 31 is secured to a wall 14. The second handle 31 being located on the wall 14 provides an additional grasping element so as to accommodate alternate configurations wherein the portable fuel tank 100 may be placed in a position on a machine wherein the first handle 25 is not accessible.

The body further includes integrated locking tabs 40. The locking tabs 40 include a first portion 41 and a second portion 42. The first portion 41 and second portion 42 are secured to a first tank 5 and a second tank 6 so as to releasably secure together The second portion 42 includes an upper member 44 having a first section 45 and a second section 46 wherein the first section 45 and second section are perpendicular with the second section 46 extending downward from the first section 45. The second portion 42 further includes a lower first section 47 and a lower second section 48 that are formed to create a void 50. Void 50 is configured to receive therein the first portion 41. The first portion 41 includes an upper leg 38 and a lower leg 39 that are formed to interlock with the second portion 42. The first portion 41 and second portion 42 extend the length of the wall 14 of the first tank 5 and second tank 6. The locking tabs 40 are operable to releasably secure a first tank 5 to a second tank 6 either during transportation or ensuing being operably coupled to a machine.

The fuel pick-up tube 72 is fluidly coupled to the fuel transfer line 90. Fuel from the interior volume of the body 10 flows through the fuel pick-up tube 72 into the fuel transfer line 90. The fuel transfer line 90 includes a one way valve 95 and further includes a quick connect assembly 98. The one-way valve 95 allows a user to shut off the gas flow during coupling and de-coupling of the portable fuel tank 100. The quick connect assembly 98 functions to provide a technique to operably couple a fuel line portion of the machine to which the portable fuel tank 100 is coupled so as to provide an efficient technique to assist in the placement and removal of the portable fuel tank.

The body 10 has integrally formed therein a receiving receptacle 60. The receiving receptacle 60 is integrally formed into the wall 14 and includes an interior volume 61 having an opening 61 providing access thereto. The receiving receptacle 60 is configured to mateably couple with connection pin 65. Connection pin 65 would be formed on the machine to which the portable fuel tank is operably coupled. The connection pin 65 includes a ball 66 coupled to a spring 67 that biases the ball 66 in an upward direction. The ball 66 is configured to operably couple with cavity 68 formed in the top wall 69 of the receiving receptacle 60. The aforementioned provides a technique to releasably secure the portable fuel tank 100 to a machine. While the receiving receptacle 60 and connection pin 65 are illustrated herein, it should be understood within the scope of the present invention that the portable fuel tank 100 could be configured with a mateable fastener of various different configurations in order to achieve the desired objective of releasably securing the portable fuel tank 100 to a machine.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable fuel tank that is configured to be releasably coupled to a machine having a combustible engine:
    a body, said body having a plurality of walls, a top and a bottom integrally formed to create an interior volume, said body being manufactured from a suitable durable material so as to receive and store a combustible fuel, said body further having a first handle, said first handle being secured to said top of said body;
    a valve, said valve being secured to said top of said body, said valve being a one-way valve, said valve being configured to allow airflow into said interior volume of said body;
    a mateable fastener, said mateable fastener being formed on said body of the portable fuel tank, said mateable fastener configured to facilitate securing of the portable fuel tank to the machine wherein the machine has a fastener configured to operable couple to the mateable fastener, wherein the mateable fastener includes a receiving receptacle, said receiving receptacle formed in said body of the portable fuel tank and wherein said mateable fastener includes a connection pin, said connection pin being secured to the machine, said connection pin configured to be inserted into the receiving receptacle so as to releasably secure the portable fuel tank to the machine, wherein the connection pin includes a spring having a ball operably coupled thereto, wherein the spring and ball are operable to be frictionally engaged with a cavity formed in the receiving receptacle;
    a locking element, wherein the locking element includes a first portion and a second portion, wherein the first portion is secured to one of the plurality of walls of said body, said second portion being secured to a second portable fuel tank wherein the locking element functions to releasably secure the portable fuel tank to the second portion fuel tank;
    wherein the portable fuel tank is further operably coupled to a fuel transfer line, said fuel transfer line further including a one-way valve, said fuel transfer line fluidly coupled to a fuel pick up tube in said body, said fuel transfer line being operably coupled to the combustible engine of the machine, said fuel transfer line further including a quick connect assembly that is configured to couple the fuel transfer line of the portable fuel tank with a fuel line of the machine.

2. The portable fuel tank as recited in claim 1, and further including a second handle, said second handle being secured to one of said plurality of walls of said body.

3. The portable fuel tank as recited in claim 2, wherein the first portion of the locking element includes a pair of parallel support members extending outward from the body of said tank wherein the pair of parallel support members include end portions that are perpendicularly formed and extending in opposite directions.

4. The portable fuel tank as recited in claim 3, wherein the second portion of the locking element includes a void, wherein the void is configured to receive the end portions of the first portion of the locking element.

* * * * *